United States Patent
Dayan et al.

(10) Patent No.: US 9,934,035 B2
(45) Date of Patent: Apr. 3, 2018

(54) DEVICE AND METHOD FOR TRACING UPDATED PREDICATE VALUES

(71) Applicants: Uri Dayan, Hertzelia (IL); Erez Arbel-Meirovich, Yahud (IL); Liron Artsi, Even-Yehuda (IL); Doron Schupper, Rehovot (IL)

(72) Inventors: Uri Dayan, Hertzelia (IL); Erez Arbel-Meirovich, Yahud (IL); Liron Artsi, Even-Yehuda (IL); Doron Schupper, Rehovot (IL)

(73) Assignee: NXP USA, Inc., Austin, TX (US)

( * ) Notice: Subject to any disclaimer, the term of this patent is extended or adjusted under 35 U.S.C. 154(b) by 392 days.

(21) Appl. No.: 14/778,093

(22) PCT Filed: Mar. 21, 2013

(86) PCT No.: PCT/IB2013/052258
§ 371 (c)(1),
(2) Date: Sep. 18, 2015

(87) PCT Pub. No.: WO2014/147446
PCT Pub. Date: Sep. 25, 2014

(65) Prior Publication Data
US 2016/0196140 A1    Jul. 7, 2016

(51) Int. Cl.
*G06F 9/30* (2006.01)
*G06F 11/34* (2006.01)
(Continued)

(52) U.S. Cl.
CPC ...... *G06F 9/30058* (2013.01); *G06F 9/30072* (2013.01); *G06F 9/30145* (2013.01);
(Continued)

(58) Field of Classification Search
CPC .......................... G06F 11/3636; G06F 11/348
See application file for complete search history.

(56) References Cited

U.S. PATENT DOCUMENTS

| 7,209,058 B2* | 4/2007 | Swoboda | ............... H03M 7/46 341/63 |
| 7,720,670 B2* | 5/2010 | Agarwala | ........... G06F 11/2268 703/23 |

(Continued)

OTHER PUBLICATIONS

International Search Report and Written Opinion correlating to PCT/IB2013/052258 dated Dec. 30, 2013.

*Primary Examiner* — Corey S Faherty

(57) ABSTRACT

A data processing device for executing a program is described. The program comprises one or more instruction groups and one or more predicates, each instruction group comprising one or more instructions. The data processing device comprises a processing unit and a trace unit connected to or integrated in the processing unit. The trace unit generates a predicate trace for tracing the values of the one or more predicates. The processing unit executes, in each of a series of execution periods, one of the instruction groups and updated the values of none, one, or more of the predicates in dependence on the respective instruction group. The trace unit appends the updated values of the none, one, or more predicates to the predicate trace and does not append any non-updated values of the predicates.
A method of reporting predicate values and a data carrier are also disclosed.

13 Claims, 4 Drawing Sheets

(51) Int. Cl.
*G06N 5/00* (2006.01)
*G06F 11/36* (2006.01)

(52) U.S. Cl.
CPC ........ *G06F 11/348* (2013.01); *G06F 11/3636* (2013.01); *G06N 5/003* (2013.01)

(56) References Cited

U.S. PATENT DOCUMENTS

| | | |
|---|---|---|
| 2002/0016907 A1 | 2/2002 | Grcxhowski et al. |
| 2003/0135719 A1 | 7/2003 | DeWitt et al. |
| 2004/0205326 A1 | 10/2004 | Sindagi et al. |
| 2006/0224868 A1* | 10/2006 | Alofs .................. G06F 11/3636 712/227 |
| 2006/0255972 A1* | 11/2006 | Swoboda ................ H03M 7/46 341/50 |
| 2006/0279443 A1* | 12/2006 | Agarwala ........... G06F 11/3636 341/139 |
| 2009/0287907 A1 | 11/2009 | Isherwood et al. |
| 2010/0077180 A1 | 3/2010 | Gonion et al. |
| 2013/0086370 A1 | 4/2013 | Burger et al. |
| 2013/0283020 A1* | 10/2013 | Ehrlich ................. G06F 9/3853 712/226 |

\* cited by examiner

US 9,934,035 B2

DEVICE AND METHOD FOR TRACING UPDATED PREDICATE VALUES

FIELD OF THE INVENTION

This invention relates to a data processing device, a method of reporting predicate values, and a data carrier.

BACKGROUND OF THE INVENTION

A computer program typically includes at least some conditional instructions. A conditional instruction is an instruction that is executed only if a certain condition is satisfied. A branch is a sequence of instructions that is executed if a condition associated with the branch is satisfied. A predicate is a variable associated with one or more instructions of the program and indicating whether these instructions are to be executed or not. A branch may thus be implemented by assigning the same predicate to each instruction of the branch. A predicate may notably be a boolean variable. When the predicate is true, the branch will be executed. When the predicate is false, the branch will not be executed. The use of predicates in programming is also referred to as predicating or as branch-predicating. Predicates are used, for example, to predicate a branch instruction, thus implementing a conditional branch. Predicating can be seen as an alternative to using branch instructions, and they can be very useful for executing the program using multiple pipelines. Predicates can be implemented in hardware (HW), software (SW), or in a combination of both HW and SW.

On some data processing machines, a program may be stored in the form of a sequence of instruction groups. An instruction group is a set of one or more instructions. Each instruction group may thus comprise one or more instructions. One instruction group may be executed per execution cycle. Instruction groups comprising two or more instructions may also be referred to as Very Long Instruction Words (VLIW) or Variable Length Execution Sets (VLESs), depending on the architecture or the manufacturer. Each instruction in the instruction group may be assigned a predicate to indicate whether the instruction is to be executed. Predicates thus allow to activate and deactivate any instruction in a given instruction group. The innovation described herein is neither limited to multi-issue processors, nor to Very Long Instruction Word (VLIW) processors. The invention is in fact applicable to any processor that has one or more predicates, including, but not limited to, multi-issue processors.

The value of a predicate may be changed (updated) in the course of executing the program. The predicate may, for example, change from true to false or vice versa. In fact, the instructions of a program may include instructions for changing the value of a predicate. The predicate values may be reported for each or for selected execution cycles in a trace (predicate trace) for the purpose of, e.g., debugging or code coverage analysis. The predicate trace may enable a programmer or an analysis program to reconstruct the predicate values which were assumed during a run of the program. The predicate values may, for example, enable an external tool to determine, for each conditionally executed instruction, whether the instruction was executed or not. This information may notably be used for code coverage analysis, an important verification technique used by software (SW) developers. Indeed, it may be insufficient to know the exact execution flow because any instruction in the flow may or may not have been executed, depending on the value of the predicate assigned to that instruction.

In any processor, real-time trace bandwidth is limited, regardless of whether the trace is written to memory or reported on, e.g., an input-output port, to trace collecting hardware (HW). For example, the StarCore SC3900 processor developed by Freescale has six predicates. Each of these predicates may be changed during each execution cycle. That is, none, one, two, three, four, five, or six of the six predicates may be changed during a given execution cycle. The SC3900 supports programs with instruction groups, which can execute up to eight different instructions per cycle. The SC3900 allows to predicate any instruction in the instruction group by any one of the six predicates. Reporting the value of each predicate in each instruction group may consume too much of the available bandwidth. It is pointed out that predicate tracing comes on top of flow tracing. Flow tracing enables a developer to know which instruction groups in the program were executed, but not which instructions inside an instruction group were executed.

SUMMARY OF THE INVENTION

The present invention provides a data processing device, a method of reporting predicate values, and a data carrier as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
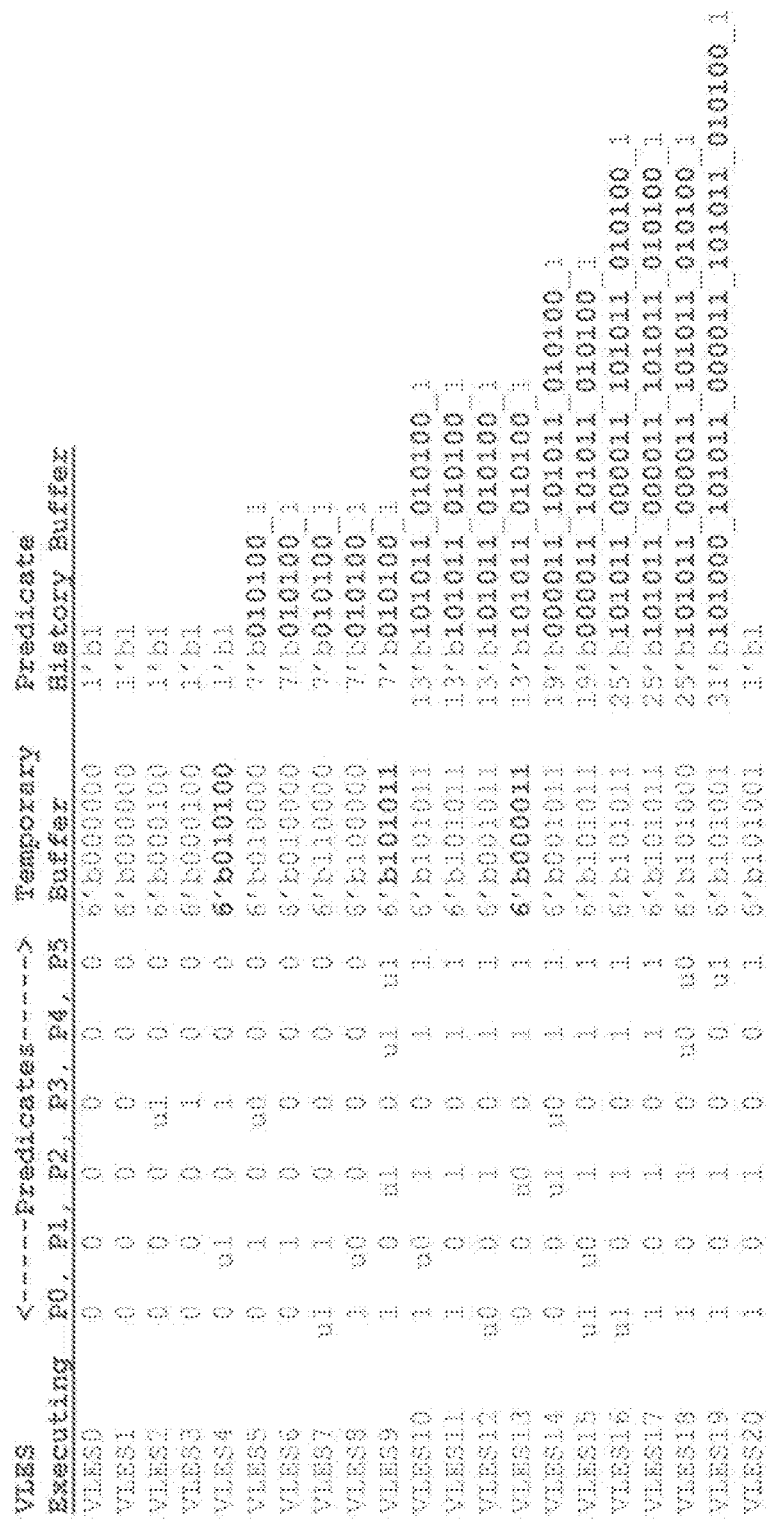
FIG. 1 shows a table illustrating an example of a method of reporting predicate values.

Referring to FIG. 1, a first example of a method of reporting predicate values is described. Column 1 ("VLES Executing") shows a sequence of instruction groups VLES0 to VLES20. Each instruction group may be executed in a single execution cycle or in several execution cycles. The time in which a single instruction group is being executed is also referred to herein as an execution period. An execution period may thus comprise one or more than one consecutive execution cycles. The shown sequence of instruction groups may be executed in, e.g., 21 subsequent execution periods numbered 0 to 20. The program may comprise one or more predicates. In the present example, the program comprises six predicates P0 to P5. Each predicate may be either 0 or 1, wherein 0 is equivalent to true and 1 is equivalent to false or vice versa. 0 and 1 or, equivalently, true and false may also be referred to as the values of the predicate in question or as the predicate values. The columns "P0" to "P5" each indicate the value of the respective predicate for the execution periods 0 to 20. In this example, as shown in the table, the predicates P0 to P5 are each 0 during the first two periods (execution of VLES0 and VLES1). In the third execution period, executing VLES2 may cause the predicate P3 to change from 0 to 1. Further updates of the predicates P0 to P5 may occur in the subsequent execution periods. It is emphasized that a predicate may be updated without changing its value. This may occur, for example, in the event of two consecutive false compare operations.

In this example, the final values of P0 to P5 may be 1, 0, 1, 0, 0, and 1, respectively, as shown in the last row of the table. Each update is indicated by the letter "U" in the table. It is pointed out that the present table is only an example and that the predicates P0 to P5 may have initial values different from the ones shown here and may be updated during execution periods different from the ones shown here.

At the end of each execution period, the values of the predicates P0 to P5 may be written to a temporary buffer. The content of the temporary buffer (shown in the column "Temporary Buffer") may be appended to a predicate trace. The predicate trace may thus reflect the predicate history, that is, the evolution of each predicate value in the course of running the program. The predicate trace may be stored in another buffer, referred to herein as the predicate history buffer or the predicate trace buffer.

Transferring the content of the temporary buffer to the predicate history buffer may require a certain bandwidth or minimum data rate. This may notably be the case in a system in which the temporary buffer and the predicate history buffer are located in separate units or modules. For example, the temporary buffer may be located within a processor or within a processor core and the predicate history buffer may be located outside the processor or processor core. The predicate history buffer may, for instance, be connected to the temporary buffer via a bus having a limited bandwidth or maximum data rate.

The predicate history buffer may, for example, be a local temporary buffer. It may be arranged to store the predicate values until, e.g., a predicate trace message is issued. The trace messages may then be sent to one or more remote buffers, for example. The remote buffers may be located off the device. In the present example, still referring to FIG. 2, the predicate history buffer empties at the last line after a predicate trace message with the buffer content has been sent. In this example, both the temporary buffer and the predicate history buffer may be local stages in the generation of the trace message. By providing the predicate trace in a compressed format, as described above, the bandwidth required for reading the predicate trace from the predicate history buffer may be reduced.

To this end, it may be beneficial to write out the content of the temporary buffer, i.e., to write out the predicate values, only when one of the predicates (P0 to P5 in this example) has been updated twice since the last write-out. The predicate trace may thus be produced in a compressed format. Furthermore, the amount of data to be transferred from the temporary buffer to the predicate history buffer in the course of running the program may be reduced.

In the present example, the following pairs of update operations trigger a write-out of the predicate values to the predicate trace: updating P3 by VLES2 and VLES5, updating P1 by VLES8 and VLES10, updating P2 by VLES13 and VLES14, updating P0 by VLES15 and VLES16, and updating P5 by VLES18 and VLES19.

Although each write-out is triggered by an update of one of the predicates, it is the content of the temporary buffer just before the respective update that is appended to a predicate trace. From the thus generated predicate trace in conjunction with information indicating which predicate is updated in which instruction group, the predicate values for each execution period may be reconstructed. For example, considering the content of the predicate history buffer in the line of VLES5 in the table, and knowing that the only updates performed in execution periods 0 to 4 are the updates of P3 in period 2 and the update of P1 in period 4, the predicate values of the elapsed execution periods 0 to 4 are easily derived.

Figure 2:
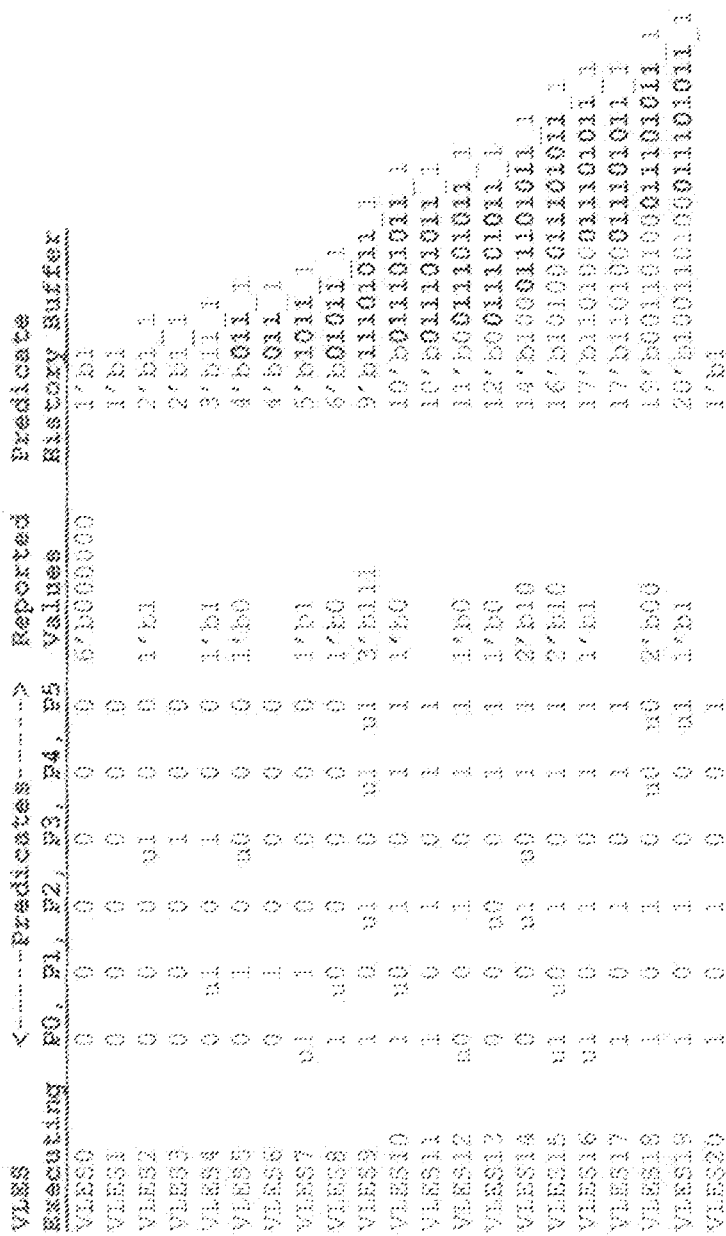
FIG. 2 shows a table for illustrating another example of a method of reporting predicate values.

Referring now to FIG. 2, another example of a method of reporting predicate values in the course of running a program is described. In this example, any update of any one of the predicate values P0 to P5 triggers a corresponding write-out to the predicate trace. In each write-out, only the value of the updated predicate is appended to the trace. It should be pointed out that the operation of appending the value of the updated predicate to the trace may include buffering the value in a temporary buffer, e.g. in a temporary history buffer. The temporary history buffer may buffer, that is, temporarily store, an accumulation of updated predicate values. When the temporary history buffer has been filled, its content may be appended to the trace stored in, e.g., an external memory unit. In the following, no distinction is made between appending the updated predicate values immediately to the trace and appending them only after buffering them in a temporary buffer.

For example, in the specific example illustrated in the table of FIG. 2, no predicate is updated in execution periods 0 and 1, and accordingly, no data is appended to the trace. In execution period 2, i.e., the execution period in which VLES2 is executed, the values of predicate P3 is updated to change from 0 to 1. Accordingly, the new value of predicate P3, namely 1, is appended to the predicate trace. Predicate values that have not been updated in the respective execution period are not appended to the predicate trace. Still considering execution period 2 (the line of VLES2 in the table), the values P0, P1, P2, P4, and P5 are not updated in the execution period and accordingly are not written out to the predicate trace.

It is pointed out that updating a predicate value does not necessarily modify the predicate value. In fact, a predicate may be updated with a value identical to its current value. It may be convenient to report updates in the same manner, regardless of whether or not the respective update operation changes the predicate value. Indeed, this can make the predicate trace easier to interpret, noting that the sequence of update operations may be deduced from, e.g., the program source code, whereas the values of the predicates may depend on initial data as well as on input data of the program. In the present example, still referring to FIG. 2, predicate P1 has the value zero at the end of VLES9 and is updated with the same value, zero, in VLES10. Accordingly, the value zero is written out to the trace in response to the update operation.

It is again pointed out that the present table is only an example and that the predicates P0 to P5 may have initial values different from those shown here and may be updated in execution periods different from the ones shown here. For example, one or more of the predicates P0 to P5 may have 1 instead of 0 as their initial values, i.e., the values in execution period 0 (the row of VLES0 in the table). The initial values of the predicates may or may not be included in the predicate trace. In the present example, they are not included in the predicate trace. Instead, they may be deduced from the predicate trace, provided that they were updated at least once. When more than one predicate is updated in a give execution period, it may be beneficial to ensure that the updated values which are appended to the predicate trace can be associated unambiguously with the respective predicates. A user or a tool may thus be enabled to deduce easily whether a certain predicate value appended to the predicate trace is the value of, e.g., P0, P1, P2, P3, P4, or P5. This may be achieved, for example, by writing out the updated predicate values of any given execution period in a predefined order. For example, the predicates may be numbered 0 to N. In the present example, N=5. For each execution period, the updated predicate values may then be appended to the predicate trace in accordance with this numbering. For example, considering now the execution period of VLES14 in the table of FIG. 2, when the predicates P2 and P3 are updated, the updated values 1 and 0 may be appended to the predicate trace in this order, i.e., the updated value of predicate P2 is appended to the trace and the updated value of predicate P3 is appended subsequently. In another example, the order in which the updated predicate values are appended to the predicate trace may be defined differently. In principle, any ordering may be chosen, and this ordering may even vary from one execution period to the other, as long as the user or an analyzing tool can unambiguously determine the order by which predicates are reported.

However, writing out the updating predicate values in accordance with a fixed, i.e. static, ordering of the predicates may be particularly simple to implement.

From the sequence of predicate update operations, the execution flow, and the corresponding predicate trace, the value of each predicate at the end of each execution period can easily be reconstructed. The reconstruction process may be viewed as decompressing the predicate trace. An uncompressed predicate trace may thus be generated, the uncompressed predicate trace indicating explicitly the value of each predicate for each execution period of the past. In other words, the entries 0 and 1 in the subtable "Predicates" of the table in FIG. 2 may be reconstructed on the basis of the predicate trace upon completion of VLES19 (or equivalently, on the basis of the column "Reported values" in the table) in conjunction with a list indicating for each execution period which predicates were updated in that execution period.

In the example scenario of FIG. 2, for instance, the values of predicate P0 may be reconstructed as follows. In a first step, the execution period in which P0 was updated for the first time is identified. In the present example, this is the execution period of VLES7. The corresponding entry in the predicate trace is then identified as 1. Accordingly, it is deduced that P0 was 0 in execution periods 0 to 6 and changed to 1 in execution period 7. Basically, the tool keeps track of the instructions that update any predicate, and hence knows that P0 is updated after three other predicates were updated from VLES0 (that is: P3 in VLES2, P1 in VLES4, P3 in VLES5, and then P0 in VLES7).

The execution period in which the next update of P0 occurred is then identified. In the present example, the next update of P0 occurred in execution period 12. From the predicate trace, it may be seen that P0 changed to 0 in execution period 12. Accordingly, it is deduced that P0 was 1 in execution periods 8 to 11 and changed to 0 in execution period 12. These steps may be performed analogously to reconstruct the values of P0 for the subsequent execution periods 13 to 20 and also for the other predicates P1 to P5. The reconstruction method described here is, of course, also applicable to a program with either fewer or more than five predicates.

The method described above in reference to FIG. 2 may result in a predicate trace that is shorter than the predicate trace generated by the method described in reference to FIG. 1. Furthermore, the method described in reference to FIG. 2 is likely to require less bandwidth because fewer entries are appended to the predicate trace. The method described in reference to FIG. 2 may therefore allow for a more cost efficient implementation in hardware or in a combination of both hardware and software.

The list of predicate update operations that are performed when the program is executed may be generated manually or automatically from, e.g., a source code of the program and knowledge of the execution flow of the program. The execution flow may be determined, for example, from an execution flow trace generated when executing the program. The execution flow trace and the predicate trace may be generated in parallel.

Figure 3:
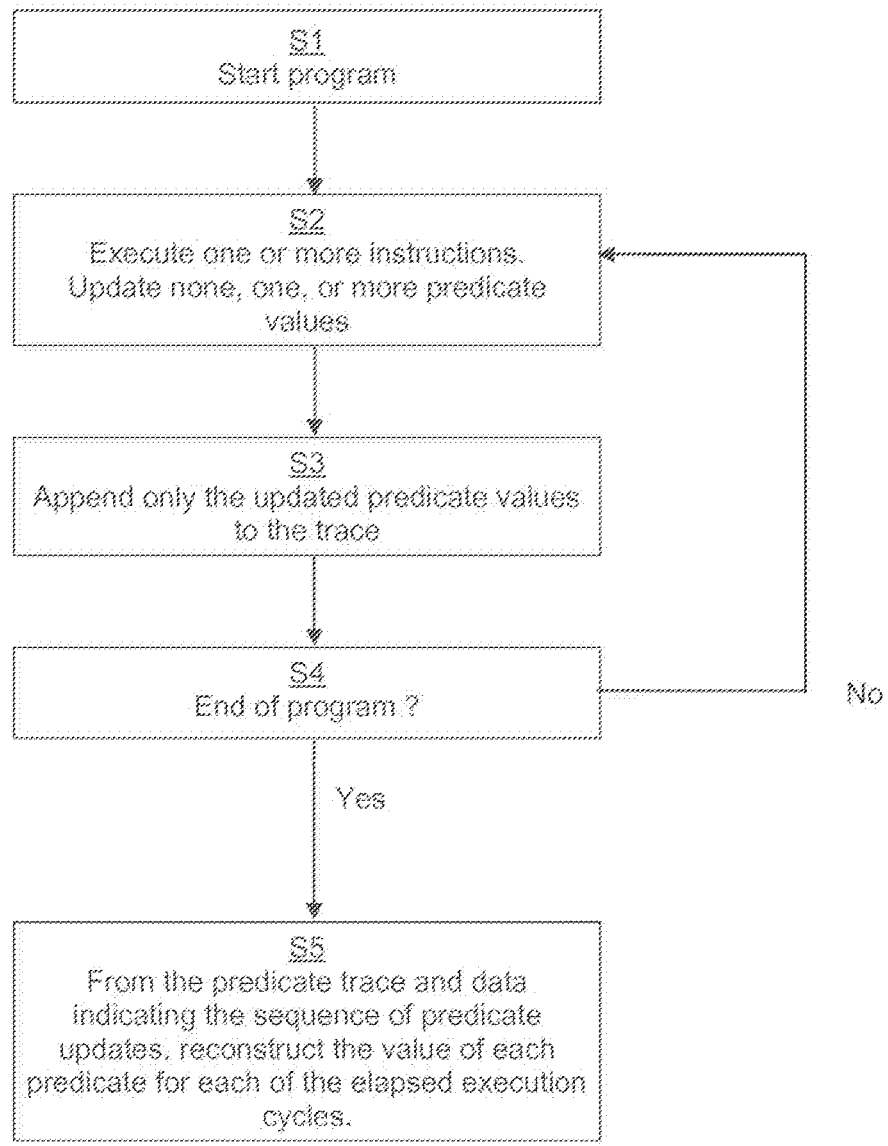
FIG. 3 shows a flowchart of an example of a method of reporting predicate values.

FIG. 3 shows a flow chart illustrating an example of a method of reporting predicate values of a program when the program is executed. The method may be identical or similar to the one described in reference to FIG. 2. The program may be started in block S1. The program may, for example, be executed by a single processor or by group of processors or processor cores. A predicate trace should be initialized, e.g., by writing initial information to the trace. The initial information may, for example, include the initial values of the predicates.

In principle, the initial values of the predicates do not necessarily have to be included in the predicate trace as they can be deduced from the updated predicate values that are eventually appended to the trace in block S4. In practice, however, including them may be beneficial in various situations. For example, the trace may have been enabled not at the start of the program; trace data may be lost due to an overrun; dynamic start-stop trace conditions may have been set, e.g., in order to save bandwidth in code areas that are of less interest; and, from a programmers point of view, it may be unsatisfactory to rely on, e.g., reset or default values of the predicates. It may notably be convenient to report the current values of all predicates in response to any interruption or discontinuity in the predicate trace, or in response to any indication that the predicate trace may have been interrupted.

In block S2, one or more instructions of the program may be executed. The executed instructions may, for example, be instructions of a single instruction group. None, one, or more predicate values may be updated in accordance with the executed instructions.

In block S3, only the updated predicate values are appended to the predicate trace. Predicate values which have not been updated in the preceding block S2 are not written to the predicate trace.

In block S4, it may be determined whether the program has reached an end. The method may in this case continue in block S5. Otherwise, blocks S2 and S3 may be repeated for a next set of one or more instructions, in a next execution period.

In block S5, the value of each predicate of each of the elapsed execution periods may be reconstructed from the predicate trace and from a list indicating, for each of the elapsed execution periods, the predicate update operations performed in that execution period.

The list indicating for each execution period the predicate update operations performed in the respective execution period may be generated before, during, or after running the program. The list may, for instance, be generated before or after running the program by an analysis of the source code of the program. In another variant, generating the list of predicate updates may be integrated in a program tracing tool for reporting the exact instruction stream, e.g., a VLES stream that is executed, including interrupts.

Figure 4:
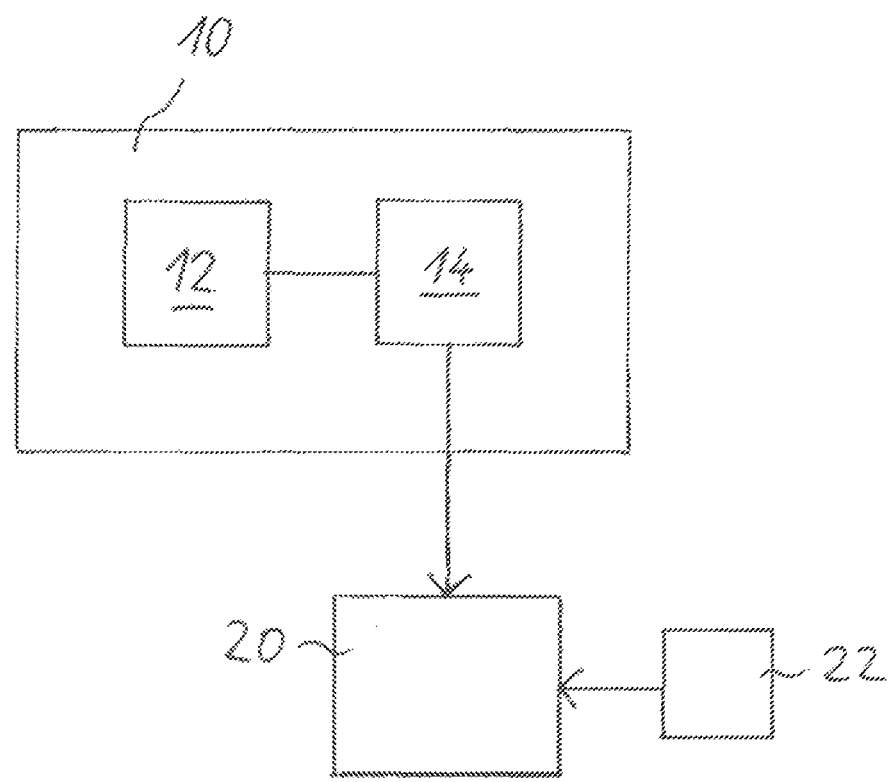
FIG. 4 schematically shows an example of an embodiment of a data processing system and a data carrier.

Referring now to FIG. 4, an example of a data processing device 10 for executing a program is described. The data processing device 10 may, for example, be a system on chip (SoC). The program comprises one or more instruction groups and one or more predicates. An instruction group is a group of instructions executed concurrently. Each instruction group may comprise one or more instructions. The data processing device may comprise a processing unit 12 and a trace unit 14. The trace unit 14 may be connected to or integrated in the processing unit 12. The trace unit may be arranged to generate a predicate trace for tracing the values of the one or more predicates. The processing unit 12 may be arranged to execute, in each of a series of execution periods, one of the instruction groups, and to update the values of none, one, or more of the predicates in dependence on the respective instruction group. The trace unit 14 may be arranged to append the updated values of the none, one, or more predicates to the predicate trace and not to append any non-updated values of the predicates. The trace unit 14 may thus generate a predicate trace of, e.g., the type described above with reference to FIGS. 2 and 3.

The trace unit 14 may be arranged to append the updated predicate values to the predicate trace in a defined order. A user or another program is thus enabled to identify each appended value correctly as the value of a certain predicate.

The trace unit may be arranged to append the updated predicate values to the predicate trace in form of a bit sequence having the same length for every predicate value. Using the same length for every predicate value makes interpreting or decompressing the predicate trace particularly simple. In a design in which the predicates are binary variables, each updated predicate value may be appended to the predicate trace as a single bit. It is pointed out, however, that the values of different predicates (e.g., P0 and P2) may be appended to the predicate trace in the form of bit sequences having different lengths. Indeed, the analyzing tool may be arranged to infer the respective length from the identity of the predicate. For example, if the value of P0 is five bits long and P2 is one bit, then if the next updated value is P0 the tool knows to read five bits.

In other words, each predicate may have associated with it a constant predicate-specific bit-length and each updated predicate value may be appended to the predicate trace in form of a bit sequence having the respective predicate-specific bit-length. The predicate-specific bit-length may notably be the same for every predicate, although is not a prerequisite for being able to interpret the predicate trace. For example, the bit-length may be 1 (one) for each predicate, e.g., in an implementation in which the predicates are boolean variables. In this case, each updated predicate value is represented by a single bit.

The trace unit may be arranged not to include in the predicate trace any data for identifying the updated predicate values. In fact, it is recognized that such identification can be made using, e.g., the source code (or information extracted therefrom) and program flow information.

The trace unit may be further arranged to generate a program trace that identifies the executed sequence of instruction groups. The program trace may be used in conjunction with the predicate trace to reconstruct past values of the predicates.

A method of reporting predicate values of a program may thus comprise:
    generating a predicate trace; and
    executing a sequence of instruction groups in a sequence of successive execution periods; wherein each execution period comprises:
    executing the respective instruction group, including updating the values of none, one, or more of the predicates in dependence on the respective instruction group; and
    appending the updated values of said none, one, or more predicates to the predicate trace and not appending any non-updated values of the predicates.

The sequence of execution periods may notably comprise one or more periods in which the values of one or more of the predicates are updated. These values are traced, that is, appended to the predicate trace. Preferably, names or identifiers of the updated predicates are not traced. The sequence of execution periods may further comprise one or more periods in which the values of one or more of the predicates are not updated. These values are not appended to the trace, thereby saving bandwidth and memory and information on the execution flow.

A program trace that identifies the executed sequence of instruction groups may be generated in response to starting the program. The value of a predicate may then be reconstructed, e.g., on the basis of the program trace and the predicate trace. The predicate value may, for example, be reconstructed on the basis of the program trace, the predicate trace, and a source code of the program.

For example, a predicate update list may be generated on the basis of a source code of the program. The predicate update list may specify for each instruction group of the program, every predicate value update instruction included in the respective instruction group. The value of the respective predicate may then be reconstructed, for any one of the predicates and for one or more of the execution periods, on the basis of the program trace, the predicate trace, and the predicate update list.

The predicate trace and the program trace may be retrieved from, e.g., the trace unit 14, by a host device 20 connected to the data processing device 10. For instance, an ethernet or a JTAG connection may be established for this purpose between the two devices 10 and 20. The host device 20 may, for example, be a general purpose computer, such as a personal computer, a workstation, or a laptop. Instructions for analyzing the predicate trace may be stored on a data carrier 22, e.g., a flash memory or a hard drive.

In another example, the data processing device 10 is sufficiently powerful to be operated to analyze the predicate trace generated by the trace unit 14. For example, the processing unit 12 may be operated to run an analysis program using the predicate trace as input data.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processing unit 12 and the trace unit 14 may be located on a single integrated circuit. Alternatively, the examples may be implemented as any number of separate integrated circuits or separate devices interconnected with each other in a suitable manner. For example, the processing unit 12 and the trace unit 14 may be separate device interconnected by, e.g., a data bus.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device for executing a program comprising one or more instruction groups and one or more predicates, the data processing device comprising:
   a processing unit; and
   a trace unit connected to or integrated in the processing unit, wherein
      each instruction group comprises one or more instructions,
      the trace unit is arranged to generate a predicate trace for tracing the values of the one or more predicates,
      the processing unit is arranged to execute, in each of a series of execution periods, one of said instruction groups, and to update the values of the predicates in dependence on the respective instruction group, and
      the trace unit is arranged to append the updated values of the predicates to the predicate trace and not to append any non-updated values of the predicates.

2. The data processing device of claim 1, wherein the trace unit is arranged to append the updated values to the predicate trace in a defined order.

3. The data processing device of claim 1, wherein each predicate has associated with it a constant predicate-specific bit-length and the trace unit is arranged to append each updated predicate value to the predicate trace in form of a bit sequence having the respective predicate-specific bit-length.

4. The data processing device of claim 3, wherein the predicate-specific bit-length is the same for every predicate.

5. The data processing device of claim 4, wherein the predicate-specific bit length is one.

6. The data processing device of claim 1, wherein the trace unit is arranged to not include in the predicate trace any data for identifying the updated predicate values.

7. The data processing device of claim 1, wherein the instruction groups are Variable Length Execution Sets.

8. The data processing device of claim 1, wherein the trace unit is further arranged to generate a program trace that identifies the executed sequence of instruction groups.

9. A method of reporting predicate values of a program comprising one or more instruction groups and one or more predicates, the method comprising:
   generating a predicate trace;
   executing a sequence of instruction groups in a sequence of successive execution periods, wherein
      each instruction group comprises one or more instructions, and
      each execution period comprises:
         executing the respective instruction group, including updating the values of the predicates in dependence on the respective instruction group; and
         appending the updated values of said predicates to the predicate trace and not appending any non-updated values of the predicates.

10. The method of claim 9, wherein said sequence of execution periods comprises:
   one or more execution periods in which the values of one or more of the predicates are updated, and
   one or more execution periods in which the values of one or more of the predicates are not updated.

11. The method of claim 10, comprising:
   in response to starting the program, generating a program trace that identifies the executed sequence of instruction groups; and
   reconstructing, for any one of the predicates and for one or more of the execution periods, the value of the respective predicate on the basis of the program trace and the predicate trace.

12. The method of claim 11, wherein the value of the respective predicate is reconstructed on the basis of the program trace, the predicate trace, and a source code of the program.

13. The method of claim 9, comprising:
   generating a predicate update list on the basis of a source code of the program, wherein the predicate update list specifies, for each instruction group of the program, every predicate value update instruction included in the respective instruction group;
   in response to starting the program, generating a program trace that identifies the executed sequence of instruction groups; and
   reconstructing, for any one of the predicates and for one or more of the execution periods, the value of the respective predicate on the basis of the program trace, the predicate trace, and the predicate update list.

* * * * *